United States Patent
Zeng et al.

(10) Patent No.: US 10,193,971 B2
(45) Date of Patent: Jan. 29, 2019

(54) METHOD, SERVER AND SYSTEM FOR APPLICATION SYNCHRONIZATION

(71) Applicant: TENCENT TECHNOLOGY (SHENZHEN) COMPANY LIMITED, Shenzhen (CN)

(72) Inventors: Dan Zeng, Shenzhen (CN); Zhihao Zheng, Shenzhen (CN); Yanping Guan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 247 days.

(21) Appl. No.: 15/168,364

(22) Filed: May 31, 2016

(65) Prior Publication Data
US 2016/0277496 A1 Sep. 22, 2016

Related U.S. Application Data

(63) Continuation of application No. PCT/CN2014/090506, filed on Nov. 6, 2014.

(30) Foreign Application Priority Data

Nov. 28, 2013 (CN) .......................... 2013-10628225

(51) Int. Cl.
*H04L 29/08* (2006.01)
*H04L 29/06* (2006.01)
(Continued)

(52) U.S. Cl.
CPC ............ *H04L 67/1095* (2013.01); *G06F 8/61* (2013.01); *G06F 17/30106* (2013.01);
(Continued)

(58) Field of Classification Search
CPC ............... H04L 67/1095; H04L 67/306; H04L 63/0876; H04L 63/20; H04L 69/04;
(Continued)

(56) References Cited

U.S. PATENT DOCUMENTS 9,244,668 B1 * 1/2016 Opos ........................ G06F 8/60
9,462,061 B2 * 10/2016 Chen ....................... H04L 67/14
(Continued)

FOREIGN PATENT DOCUMENTS

| CN | 102176695 A | 9/2011 |
| CN | 102497407 A | 6/2012 |

(Continued)

OTHER PUBLICATIONS

The World Intellectual Property Organization (WIPO) International Search Report for PCT/CN2014/090506 dated Feb. 17, 2015.
(Continued)

*Primary Examiner* — James E Springer
(74) *Attorney, Agent, or Firm* — Anova Law Group, PLLC

(57) ABSTRACT

A method is provided for application synchronization. The method includes: establishing a communication connection between an originating terminal and a destination terminal, where the originating terminal and the destination terminal log in the server through a same login account, and receiving a synchronization request message sent by the originating terminal, where the synchronization request message includes a program identification of a target application and a terminal identification of the destination terminal. The method also includes: based on the terminal identification of the destination termini, obtaining device information and address information of the destination terminal, querying an installation file matching with the program identification of the target application and the device information of the
(Continued)

destination terminal, and sending the installation file to the destination terminal specified by the address information.

18 Claims, 4 Drawing Sheets

(51) Int. Cl.
    *G06F 21/44*     (2013.01)
    *G06F 8/61*     (2018.01)
    *G06F 17/30*     (2006.01)

(52) U.S. Cl.
    CPC ........ *G06F 17/30867* (2013.01); *G06F 21/44* (2013.01); *H04L 63/0876* (2013.01); *H04L 63/20* (2013.01); *H04L 67/306* (2013.01); *H04L 69/04* (2013.01)

(58) Field of Classification Search
    CPC ................ G06F 8/61; G06F 17/30106; G06F 17/30867; G06F 21/44
    USPC .......................................................... 709/219
    See application file for complete search history.

(56) References Cited

U.S. PATENT DOCUMENTS

| | | | | |
|---|---|---|---|---|
| 9,762,598 | B1* | 9/2017 | Jagpal | ................. H04L 63/1416 |
| 2003/0014368 | A1* | 1/2003 | Leurig | ............... G06Q 20/0425 |
| | | | | 705/64 |
| 2005/0149620 | A1* | 7/2005 | Kirkland | ............... G06Q 10/10 |
| | | | | 709/207 |
| 2009/0234478 | A1* | 9/2009 | Muto | ................. H04L 67/1095 |
| | | | | 700/94 |
| 2010/0235830 | A1* | 9/2010 | Shukla | ................ G06F 9/44526 |
| | | | | 718/1 |
| 2013/0041959 | A1* | 2/2013 | Bengtsson | .............. H04L 51/14 |
| | | | | 709/206 |
| 2013/0238742 | A1* | 9/2013 | Kay | ....................... G06F 9/5016 |
| | | | | 709/213 |
| 2014/0007084 | A1* | 1/2014 | Ding | ......................... G06F 8/61 |
| | | | | 717/178 |
| 2014/0025949 | A1* | 1/2014 | Kay | .................... H04L 63/0428 |
| | | | | 713/168 |
| 2014/0089914 | A1* | 3/2014 | Kay | ......................... G06F 8/61 |
| | | | | 717/176 |
| 2015/0222700 | A1* | 8/2015 | Kay | ................... H04L 67/1095 |
| | | | | 709/203 |
| 2016/0014107 | A1* | 1/2016 | Hamauzu | ............... H04L 63/08 |
| | | | | 726/5 |
| 2017/0102930 | A1* | 4/2017 | Sawaya | ..................... G06F 8/61 |

FOREIGN PATENT DOCUMENTS

| | | |
|---|---|---|
| CN | 102572096 A | 7/2012 |
| CN | 102937919 A | 2/2013 |
| CN | 103019757 A | 4/2013 |
| CN | 104092715 A | 10/2014 |

OTHER PUBLICATIONS

The State Intellectual Property Office of the People's Republic of China (SIPO) Office Action 1 for 201310628225.7 dated Sep. 25, 2015.

The State Intellectual Property Office of the People's Republic of China (SIPO) Office Action 2 for 201310628225.7 dated Dec. 10, 2015.

The State Intellectual Property Office of the People's Republic of China (SIPO) Office Action 3 for 201310628225.7 dated Feb. 22, 2016.

* cited by examiner

METHOD, SERVER AND SYSTEM FOR APPLICATION SYNCHRONIZATION

CROSS-REFERENCES TO RELATED APPLICATIONS

This application is a continuation of PCT Application No. PCT/CN2014/090506, filed on Nov. 6, 2014, which claims priority of Chinese Patent Application No. 201310628225.7, filed on Nov. 28, 2013. The entire content of the two applications is incorporated by reference herein.

FIELD OF THE INVENTION

The present invention generally relates to the Internet technology field and, more particularly, to an application synchronization method, server and system.

BACKGROUND

With the development of network technology and the popularity of mobile intelligent terminals, people are using more and more terminal devices. Through these terminal devices, such as televisions, cell phones, car TVs and tablet computers, etc., people can access the Internet to obtain information to meet the demand of daily work and entertainment. Designed for different application scenarios, these terminal devices are built on different platforms. However, a user may need to use a same application service among various terminal devices.

With current technologies, if the user wants to use the same application service on terminal devices with different platforms, such as a map navigation application, the user needs to download and to install different applications for different platforms from an electronic market. For example, for a terminal device with Android platform, the user needs to download and install an Android application from the electronic market, and for a terminal device with IOS platform, the user needs to download and install an IOS application. Thus, for a user with a large number of terminal devices, the operations can be very cumbersome.

The disclosed methods and structures are directed to solve one or more problems set forth above and other problems.

BRIEF SUMMARY OF THE DISCLOSURE

The disclosed embodiments of the present invention provide an application synchronization method, server and system to solve the complicated and cumbersome operation issues occurred in current technologies during application synchronization.

One aspect of the present invention provides an application synchronization method, the method includes the following steps. At the beginning, a server establishes a communication connection between an originating terminal and a destination terminal, the originating terminal and the destination terminal log in the server through a same login account. The server receives a synchronization request message sent by the originating terminal, the synchronization request message includes a program identification of a target application and a terminal identification of the destination terminal. Based on the terminal identification of the destination termini, the server obtains device information and address information of the destination terminal. The server then queries an installation file matching with the program identification of the target application and the device information of the destination terminal. Finally, the server sends the installation file to the destination terminal specified by the address information.

Another aspect of the present invention provides an application synchronization server, the server includes a connecting module, a receiving module, an obtaining module, a querying module, a first synchronizing module. The connecting module is configured to establish a communication connection between an originating terminal and a destination terminal. The originating terminal and the destination terminal respectively log in the server through a same login account. Further, the receiving module is configured to receive a synchronization request message sent by the originating terminal, and the synchronization request message includes a program identification of a target application and a terminal identification of the destination terminal. The obtaining module is configured to obtain device information and address information of the destination terminal based on the terminal identification of the destination terminal. The querying module is configured to query an installation file matching with the program identification of the target application and the device information of the destination terminal. The first synchronizing module is configured to send the installation file to the destination terminal based on the address information.

Other aspects of the present disclosure can be understood by those skilled in the art in light of the description, the claims, and the drawings of the present disclosure.

BRIEF DESCRIPTION OF THE DRAWINGS

The accompanying drawings are used to illustrate more clearly the embodiments of the present invention. Obviously, the drawings illustrate certain embodiments of the present invention. Those skilled in the art may obtain other drawings based on these disclosed drawings without creative efforts.

DETAILED DESCRIPTION

In order to make the purposes, technical solutions and advantages of the present invention more clear and complete, the followings, together with accompanying drawings, describe in detail certain embodiments of the present invention. Based on the disclosed embodiments of the present invention, those skilled in the art may easily obtain other embodiments without creative efforts.

Certain terms are used to describe the following embodiments. The term "SSO" refers abbreviation of Single Sign- On. It may be applied in the access control of multiple application systems. With SSO, a user only needs to log in once to access all mutual-trusted systems. The term "APP" refers to abbreviation of Application. With the popularity of smart phones like iPhone, APP now refers to the third-party application on smart phones.

Figure 5:
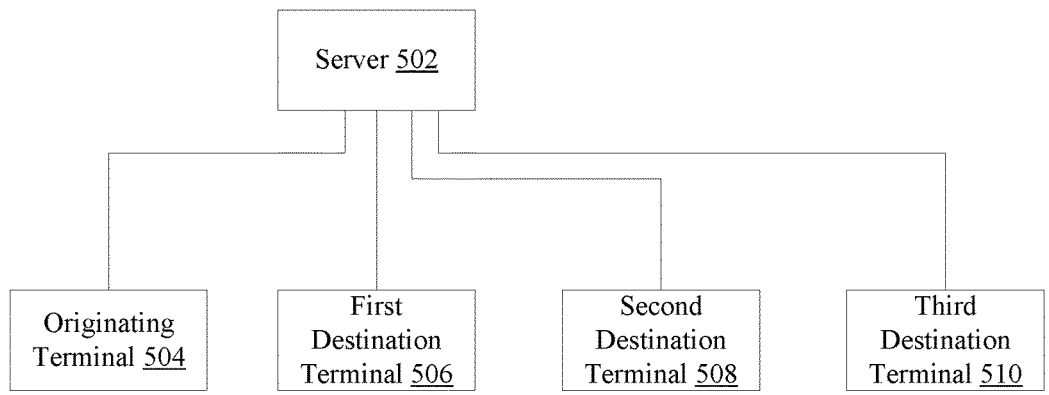
FIG. 5 illustrates a schematic block diagram of an exemplary application synchronization system according to disclosed embodiments of the present invention.

According to the disclosed embodiments, an application synchronization system is provided. As shown in FIG. 5, the application synchronization system may include a server, an originating terminal, and one or more destination terminals, such as a first destination terminal, a second destination terminal and a third destination terminal. The server may establish communication channels respectively with each terminal. After receiving an application synchronization request from the original terminal, the server sends the corresponding application information to each destination terminal to be synchronized. In practical applications, the server and each terminal may be implemented by any appropriate computing system.

Figure 6:
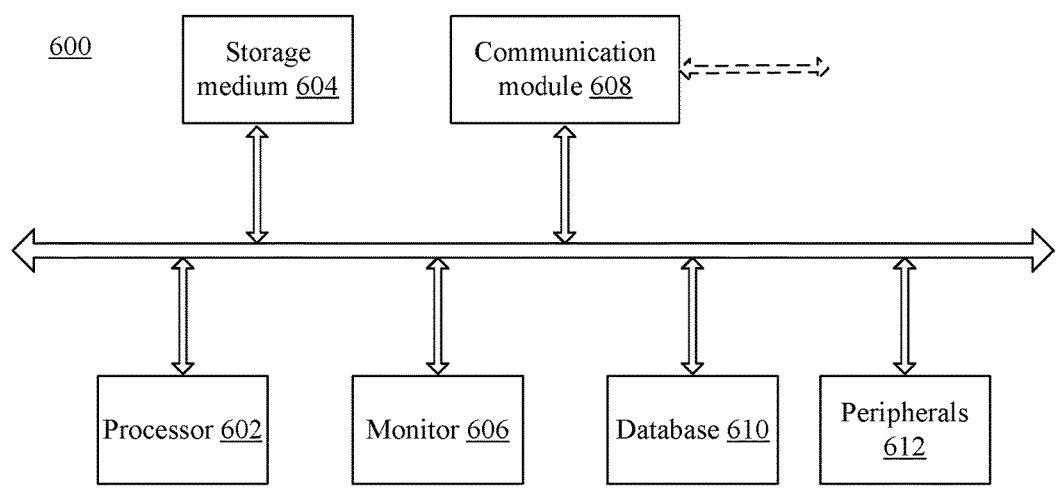
FIG. 6 illustrates a block diagram of an exemplary computing system for application synchronization according to disclosed embodiments of the present invention.

FIG. 6 shows a block diagram of an exemplary computing system 600 for application synchronization according to disclosed embodiments of the present invention. As shown in FIG. 6, computing system 600 may include a processor 602, a storage medium 604, a monitor 606, a communication module 608, a database 610, and peripherals 612. Certain devices may be omitted and other devices may be included.

Processor 602 may include any appropriate processor or processors. Further, processor 602 can include multiple cores for multi-thread or parallel processing. Storage medium 604 may include memory modules, such as ROM, RAM, flash memory modules, and erasable and rewritable memory, and mass storages, such as CD-ROM, U-disk, and hard disk, etc. Storage medium 604 may store computer programs for implementing various processes, when executed by processor 602.

Further, peripherals 612 may include I/O devices such as keyboard and mouse, and communication module 608 may include network devices for establishing connections through the communication network. Database 610 may include one or more databases for storing certain data and for performing certain operations on the stored data, such as database searching.

In operation, the server and/or the terminals (as implemented by computing system 600) may perform the application synchronization in the disclosed application synchronization method.

Figure 1:
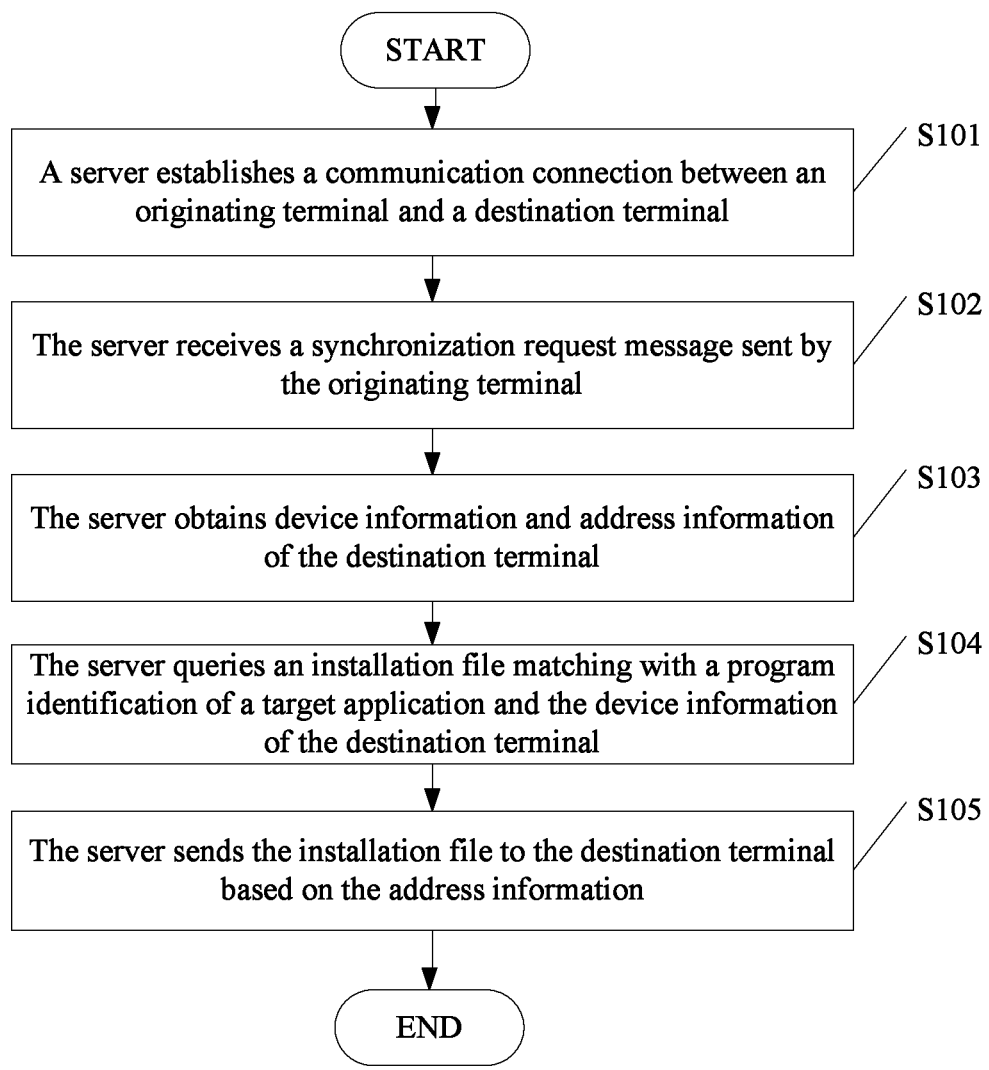
FIG. 1 illustrates a flow chart of an exemplary application synchronization method according to disclosed embodiments of the present invention.

FIG. 1 illustrates a flow chart of an exemplary application synchronization method according to disclosed embodiments of the present invention. As shown in FIG. 1, the method includes the following steps.

S101, a server establishes a communication connection between an originating terminal and a destination terminal, both the originating terminal and the destination terminal may log in the server with a same account ID.

Specifically, both the originating terminal and the destination terminal have been established respectively the communication channels with the server. The originating terminal and the destination terminal may log in the server with a same account system. After the communication channels between the server and the originating terminal and between the server and the destination terminal are established, the server assigns respectively a unique terminal identification to the originating terminal and the destination terminal. The terminal identification of the originating terminal and the terminal identification of the destination terminal are used to distinguish different terminal devices. Meanwhile, the server obtains address information and device information of the originating terminal and the destination terminal to establish a mapping relationship among the terminal identification, the address information and the device information.

After the communication channels between the originating terminal and the server and between the server and the destination terminal are established, a device list is displayed on the originating terminal and the destination terminal. The server sends the assigned terminal identifications to each connected originating terminal and destination terminal.

For example, if an originating terminal 1, a destination terminal 2, a destination terminal 3 and a destination terminal 4 all have been established respectively the communication channels with the server, the device list including the destination terminal 2, the destination terminal 3 and the destination terminal 4 is displayed on the originating terminal 1. The device list including the originating terminal 1, the destination terminal 3 and the destination terminal 4 is displayed on the destination terminal 2. The device list including the originating terminal 1, the destination terminal 2 and the destination terminal 4 is displayed on the destination terminal 3. Further, the device list including the originating terminal 1, the destination terminal 2 and the destination terminal 3 is displayed on the destination terminal 4. Each terminal stores the terminal identifications assigned by the server of the devices in the device list.

S102, the server receives a synchronization request message sent by the originating terminal, the synchronization request message includes a program identification of a target application and the terminal identification of the destination terminal.

Specifically, the originating terminal sends the synchronization request message to the server, the synchronization request message includes the program identification of the target application and the terminal identification of the destination terminal. The target application may be an application installed on the originating terminal which needs to be synchronized, and the program identification of the target application may be a string and/or letters to distinguish different applications. The target applications with a same functionality have the same identification information.

For example, the same application respectively for Android OS and IOS can have the same program identification. It can be understood that the synchronization request message includes the terminal identification of at least one destination terminal. When an application needs to be synchronized on multiple destination terminals, the terminal identifications of the corresponding destination terminals are added in the synchronization request message, so the server may synchronize the specified destination terminals.

S103, the server obtains the device information and the address information of the destination terminal based on the terminal identification of the destination terminal. Specifically, the server stores in advance the mapping relationship among the terminal identification, the device information, and the address information of the destination terminal. The server, based on the terminal identification of the destination terminal included in the synchronization request message sent by the originating terminal, obtains the device information and the address information of the destination terminal. The device information includes hardware and software information of the destination terminal, which includes device type, screen size, resolution and operating system of the destination terminal, etc. The address information specifies a network address of the destination terminal, which may be an IP address.

S104, the server queries an installation program matching with the program identification of the target application and the device information of the destination terminal.

Specifically, the server is configured with an application database for different terminal devices to store installation files for several applications. The installation file carries the program identification and the device information. The program identification carried in the installation file is used to represent a name of the application and the device information is used to indicate the terminal device for the installation file.

For example, App1 and App2 are two installation files stored in the application database. The program identification carried in a header of App1 is "weixin" and the device information carried in App1 is "Iphone5S, IOS7". The program identification carried in the header of App2 is "weixin" and the device information is "Sumsung9100, Android 4.01". The server queries in the application database for the installation file matching with the program identification of the target application and the device information of the destination terminal.

Assuming that the target program is an instant message application, the program identification of the target program is "QQ", the obtained device information of the destination terminal shows that the device type is "Iphone5S" and the operating system is "IOS7". The server may use program identification "QQ" and device information "Iphone5S, IOS" as matching conditions to query the installation file for the instant message application in the application database. It can be understood that the device type of the originating terminal and the destination terminal may not be restricted, so the terminal may be a TV, a tablet computer, a smart phone, a personal computer, etc.

S105, the server sends the installation file to the destination terminal based on the address information. Specifically, the server sends the installation file queried in S103 to the destination terminal based on the address information obtained in S102, so the destination terminal may run and install the installation file.

According to the disclosed embodiments of the present invention, the server queries the installation file matching with the destination terminal based on the program identification of the target application and the terminal identification of the destination terminal included in the synchronization request message sent by the originating terminal, and sends the installation file to the destination terminal, so the destination terminal can run and install the installation file. Thus, the application needed by the user can be automatically synchronized to the destination terminal without the need of the user to manually download and install the file, making the user operation more convenient.

Figure 2:
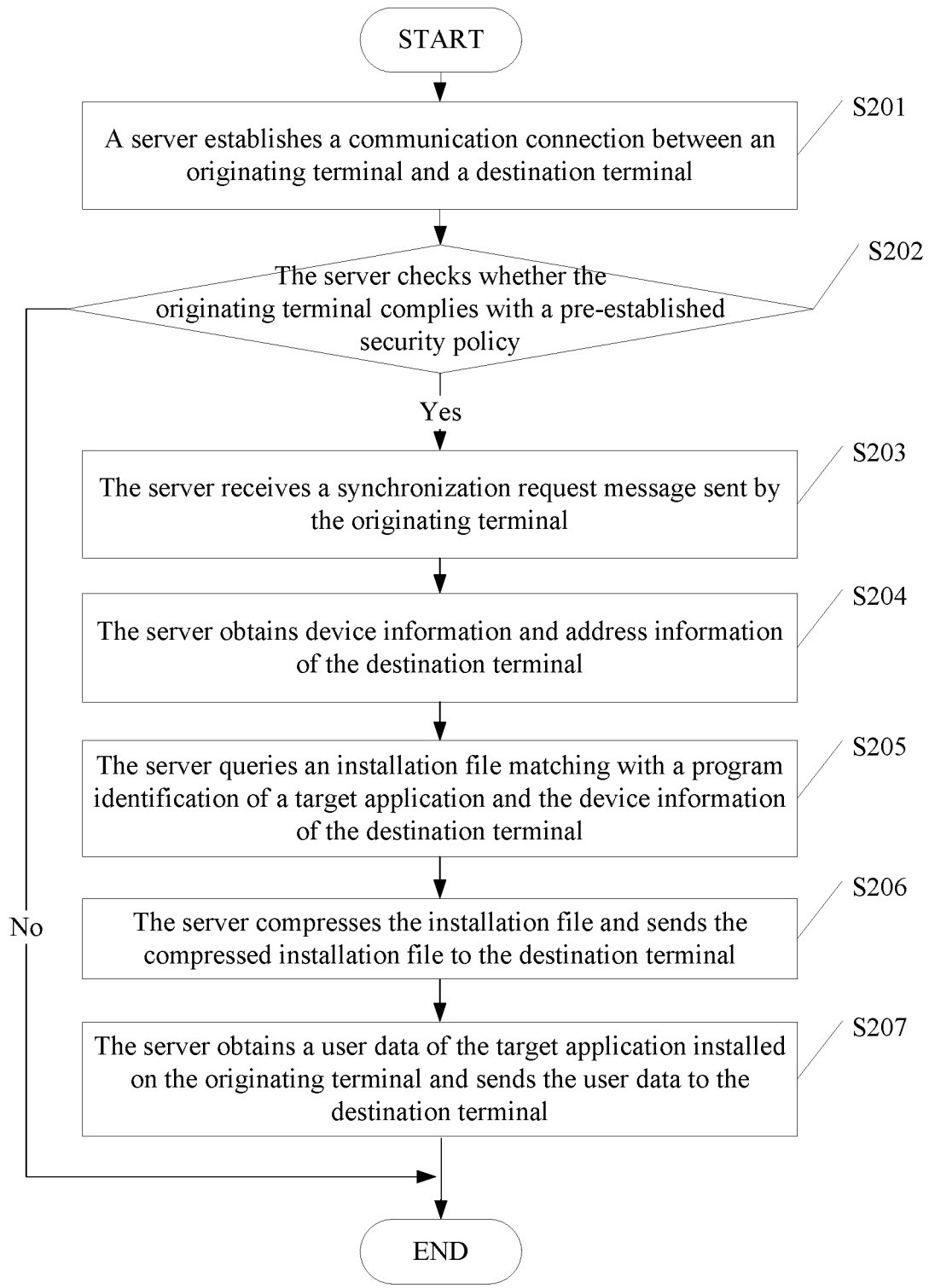
FIG. 2 illustrates a flow chart of another exemplary application synchronization method according to disclosed embodiments of the present invention.

FIG. 2 illustrates a flow chart of another application synchronization method according to disclosed embodiments of the present invention. As shown in FIG. 2, the method includes the following steps.

S201, a server obtains device information and address information of a destination terminal based on a terminal identification of the destination terminal. Specifically, a communication channel between an originating terminal and the destination terminal has been established. The originating terminal and the destination terminal may log in the server with a same account.

After the server establishes the communication connections with the originating terminal and the destination terminal, the server assigns respectively a unique terminal identification to the originating terminal and the destination terminal. The terminal identification may be letters and/or numbers and is used to distinguish different terminal devices. Meanwhile, the server obtains address information and device information of the originating terminal and the destination terminal to establish a mapping relationship among the terminal identification, the address information and the device information.

After the communication channels between the originating terminal and the server and between the server and the destination terminal are established, a device list is displayed on the originating terminal and the destination terminal. The server sends the assigned terminal identifications to each connected originating terminal and destination terminal.

For example, after an originating terminal 1, a destination terminal 2, a destination terminal 3 and a destination terminal 4 all have established respectively the communication channels with the server, the device list including the destination terminal 2, the destination terminal 3 and the destination terminal 4 is displayed on the originating terminal 1. The device list including the originating terminal 1, the destination terminal 3 and the destination terminal 4 is displayed on the destination terminal 2. The device list including the originating terminal 1, the destination terminal 2 and the destination terminal 4 is displayed on the destination terminal 3. Further, the device list including the originating terminal 1, the destination terminal 2 and the destination terminal 3 is displayed on the destination terminal 4. Each terminal stores the terminal identifications assigned by the server of the devices in the device list.

S202, the server checks whether the originating terminal complies with a pre-established security policy. Specifically, the server may perform a virus scan on the originating terminal. If the originating terminal passes the virus scan, the originating terminal complies with the pre-established security policy. The server may also perform the virus scan on the destination terminal at the same time. And the destination terminal is allowed to establish connection to the server only when it passes the virus scan.

S203, the server receives a synchronization request message sent by the originating terminal, the synchronization request message includes a program identification of a target application and the terminal identification of the destination terminal.

Specifically, the originating terminal sends the synchronization request message to the server, the synchronization request message includes the program identification of the target application and the terminal identification of the destination terminal. The target application may be an application installed on the originating terminal which needs to be synchronized, and the program identification of the target application may be a string and/or letters to distinguish different applications. The target applications with a same functionality have the same identification information.

For example, the "weixin" applications for Android OS and IOS respectively have the same program identification. It can be understood that the synchronization request message includes the terminal identification of at least one destination terminal. When an application needs to be synchronized on multiple destination terminals, the terminal identifications of the corresponding destination terminals are added in the synchronization request message, so the server may synchronize the specified terminal devices.

S204, the server obtains the device information and the address information of the destination terminal based on the terminal identification of the destination terminal. Specifically, the server stores in advance the mapping relationship among the terminal identification, the device information and the address information of the destination terminal.

The server, based on the terminal identification of the destination terminal included in the synchronization request message sent by the originating terminal, obtains the device information and the address information of the destination terminal. The device information includes hardware and software information of the destination terminal, which includes device type, screen size, resolution and operating system of the destination terminal. The address information specifies a network address of the destination terminal, which may be an IP address.

S205, the server queries an installation program matching with the program identification of the target application and the device information of the destination terminal. Specifically, the server is configured with an application database for different terminal devices to store installation files for several applications. The server queries in the application database the installation file matching with the program identification and the device information of the destination terminal.

For example, assuming that the target program is a "weixin" application, the obtained device information of the destination terminal indicates that the device type is "AA-BB", the operating system is "IOS7" and device has a 5' screen with a resolution of 800×400, the server queries the installation file for the "weixin" application matching with the above device information in the application database. It can be understood that the device type of the originating terminal and the destination terminal may not be restricted, so the terminal can be such as a TV, a tablet computer, a smart phone, a personal computer, etc.

S206, after the server compresses the installation file, the server sends the compressed installation file to the destination terminal specified by the address information. Specifically, the server sends the compressed installation file to the destination terminal specified by the address information to save the traffic consumption of the server occurred during the transfer of the installation file.

Further, after the transmission of the installation file is completed successfully, the server returns a prompt message to the originating terminal to indicate the success of the synchronization.

S207, the server obtains a user data of the target application installed on the originating terminal and sends the user data to the destination terminal. Specifically, the user data is the data generated when the user installs the target application on the originating terminal, such as chat logs, system logs and software configuration parameters, etc. Assuming that the target application installed on the originating terminal is a "weixin" application, the server obtains the user data occurred during the installation of the "weixin" application on the originating terminal and sends the user data to the destination terminal. The destination terminal loads the user data into the installed target application, so that the target application on the destination terminal can be synchronized with application on the originating terminal.

Thus, according to the disclosed embodiments of the present invention, the server queries the installation file matching with the destination terminal based on the program identification of the target application and the terminal identification of the destination terminal included in the synchronization request message sent by the originating terminal, and sends the installation file to the destination terminal, so the destination terminal can run and install the installation file. Thus the application needed by the user can be automatically synchronized to the destination terminal without the need of the user to manually download and install the file, making the user operation more convenient.

Figure 3:
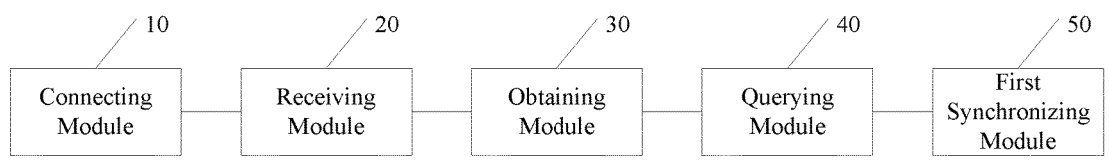
FIG. 3 illustrates a schematic block diagram of an exemplary server according to disclosed embodiments of the present invention.

FIG. 3 illustrates a schematic block diagram of a server according to disclosed embodiments of the present invention. As shown in FIG. 3, the server includes a connecting module 10, a receiving module 20, an obtaining module 30, a querying module 40 and a first synchronizing module 50.

The connecting module 10 is configured to establish a communication connection between an originating terminal and a destination terminal, wherein the originating terminal and the destination terminal uses a same account to log in the server. Specifically, the connecting module establishes a connection channel between the originating terminal and the destination terminal, the originating terminal and the destination terminal may use a same account system to log in the server.

After the communication connections between the server and the originating terminal and between the server and the destination terminal are established, the server assigns respectively a unique terminal identification to the originating terminal and the destination terminal. The terminal identification is used to distinguish different terminal devices. Meanwhile, the server obtains address information and device information of the originating terminal and the destination terminal to establish a mapping relationship among the terminal identification, the address information and the device information.

After the connection channels between the server and the originating terminal and between the server and the destination terminal are established, a device list is displayed on the originating terminal and the destination terminal, the server sends the assigned terminal identifications to each connected terminals: originating terminal and destination terminal. For example, after an originating terminal 1, a destination terminal 2, a destination terminal 3 and a destination terminal 4 all have been established respectively the communication channels with the server, the device list including the destination terminal 2, the destination terminal 3 and the destination terminal 4 is displayed on the originating terminal 1. The device list including the originating terminal 1, the destination terminal 3 and the destination terminal 4 is displayed on the destination terminal 2. The device list including the originating terminal 1, the destination terminal 2 and the destination terminal 4 is displayed on the destination terminal 3. Further, the device list including the originating terminal 1, the destination terminal 2 and the destination terminal 3 is displayed on the destination terminal 4. Each terminal stores the terminal identifications assigned by the server of the devices in the device list.

The receiving module 20 is configured to receive a synchronization request message sent by the originating terminal, the synchronization request message includes a program identification of a target application and the terminal identification of the destination terminal.

Specifically, the receiving module 20 receives the synchronization request message sent by the originating terminal, the synchronization request message includes the program identification of the target application and the terminal identification of the destination terminal, the target application is an application which is installed on the originating terminal and needs to be synchronized. The program identification of the target application is a string and/or letters to distinguish different applications. The target applications with the same functionality have the same identification. For example, a "weixin" application for Android OS and the "weixin" application for IOS have the same program identification.

It can be understood that the synchronization request message includes the terminal identification of at least one destination terminal. When multiple destination terminals are to be synchronized, the synchronization request message just needs to add the terminal identification of the corresponding terminal to synchronize a specified terminal device.

The obtaining module 30 is configured to obtain address information and device information of the destination terminal based on the terminal identification of the destination terminal. Specifically, the server stores in advance a mapping relationship among the terminal identification of the destination terminal, the device information and the address information.

The obtaining module 30 obtains the device information and the address information of the destination terminal based on the terminal identification of the destination terminal included in the synchronization request message sent by the originating terminal. The device information includes hardware and software information of the destination terminal, such as device type, screen size, resolution and operating system of the destination terminal. The address information specifies a network address of the destination terminal, which may be an IP address.

The querying module 40 is configured to query an installation file matching with the terminal identification and the device information of the destination terminal. Specifically, the server is configured with an application database for different terminal devices to store installation files for several applications. The server queries in the application database the installation file matching with the program identification and the device information of the destination terminal.

For example, assuming that the target program is the "weixin" application, the obtained device information of the destination terminal includes "AA-BB" as the device type, "IOS7" as the operation system and with a 5' screen and 800×400 resolution, the server queries the installation file for the "weixin" application matching with the above device information in the application database. It can be understood that the device type of the originating terminal and the destination terminal is not restricted. For example, the terminal device can be a TV, a tablet computer, a smart phone, a personal computer, etc.

The first synchronizing module 50 is configured to send the installation file to the destination terminal based on the address information. According to the disclosed embodiments of the present invention, the server queries the installation file matching with the destination terminal based on the program identification of the target application and the terminal identification of the destination terminal included in the synchronization request message sent by the originating terminal, and sends the installation file to the destination terminal, so the destination terminal can run and install the installation file. Thus, the application needed by the user can be automatically synchronized to the destination terminal without the need of the user to manually download and install the file, making the user operation more convenient.

Figure 4:
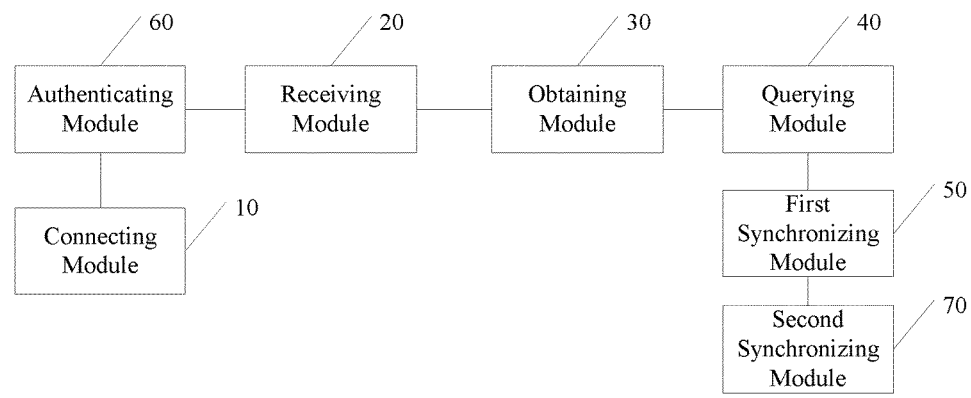
FIG. 4 illustrates a schematic block diagram of another exemplary server according to disclosed embodiments of the present invention.

FIG. 4 illustrates a schematic block diagram of another server according to disclosed embodiments of the present invention. As shown in FIG. 4, besides the connecting module 10, the receiving module 20, the obtaining module 30, the querying module 40 and the first synchronizing module 50, the server further includes an authenticating module 60 and a second synchronizing module 70.

The authenticating module 60 is configured to check whether the originating terminal complies with a pre-established security policy. If the originating terminal complies with the pre-established security policy, the authenticating module 60 instructs the obtaining module 30 to proceed.

The second synchronizing module 70 is configured to obtain a user data of the target appellation installed on the originating terminal and to send the user data to the destination terminal.

Alternatively, the first synchronizing module 50 may be configured to compress the installation file and send the compressed installation file to the destination terminal specified by the address information. The first synchronizing module 50 may further be configured to return a synchronization success indication message to the originating terminal after the transfer of the installation file is completed successfully.

FIG. 5 illustrates a schematic block diagram of an application synchronization system according to disclosed embodiments of the present invention. As shown in FIG. 5, the application synchronization system includes a server 502, an originating terminal 504, a first destination terminal 506, a second destination terminal 508 and a third destination terminal 510.

The connection channels are established respectively between the server 502 and each terminal, including the originating terminal 504, the first destination terminal 506, the second destination terminal 508 and the third destination terminal 510. Specifically, the connections channels may be established by logging in the server 502 with an account in a same account system, for example by logging in the server 502 with a Tencent QQ account.

The server 502 assigns respectively a unique terminal identification to the originating terminal 504 and the destination terminals (506, 508, 510). Meanwhile, the server 502 obtains address information and device information of the originating terminal 504 and the destination terminals (506, 508, 510), and establishes a mapping relationship among the terminal identification, the address information and the device information.

After the connection channels between the server 502 and the originating terminal 504 and between the server 502 and each destination terminal (506, 508, 510) are established, a device list is displayed on the originating terminal 504 and on the destination terminals (506, 508, 510), the server 502 sends the assigned terminal identifications to each connected terminals. For example, the device list of the first destination terminal 506, the second destination terminal 508 and the third destination terminal 510 are displayed on the originating terminal 504. The device list of the originating terminal, the second and the third destination terminal is displayed on the first destination terminal. The device list of the originating terminal, the first and the third destination terminal is displayed on the second destination terminal, and the device list of the originating terminal, the first and second destination terminal is displayed on the third destination terminal. Each list stores the terminal identification of each listed device assigned by the server.

The originating terminal sends a synchronization request message to the server, the synchronization request message includes a program identification of the target application and the terminal identifications of the destination terminals. The target application may be an application installed on the originating terminal which needs to be synchronized, and the program identification of the target application may be a string and/or letters to distinguish different applications. The target applications with a same functionality have the same identification information. For example, the "weixin" application for Android OS has the same program identification as the "weixin" application for IOS.

It can be understood that the synchronization request message includes the terminal identification of at least one destination terminal. When an application needs to be synchronized on multiple destination terminals, the terminal identifications of the corresponding destination terminals are added in the synchronization request message, so the server may synchronize the specified terminal devices. For example, the synchronization request message described in the disclosed embodiments includes the terminal identifications of the first, the second and the third destination terminal.

The server stores in advance a mapping relationship among the terminal identification, the device information and the address information of the destination terminal. The server, based on the terminal identification of the destination terminal in the synchronization request message sent by the originating terminal, obtains the device information and the address information of the destination terminal. The device information specifies hardware information and software information of the destination terminal, including device type, screen size, resolution and operating system of the destination terminal. The address information specifies a network address of the destination terminal, which may be an IP address.

The server may be configured with an application database for different terminal devices to store installation files. The server queries the application database the installation file matching with the program identification and the device information of the destination terminal. For example, the server queries a first installation file matching with the device information of the first destination terminal, a second installation file matching with the device information of the second destination terminal and a third installation file matching with the device information of the third destination terminal. The server sends the installation files to the corresponding destination terminals based on the address information, so the destination terminals can run the installation files.

According to the disclosed embodiments of the present invention, the server queries the installation file matching with the destination terminal based on the program identification of the target application and the terminal identification of the destination terminal included in the synchronization request message sent by the originating terminal, and sends the installation file to the destination terminal, so the destination terminal can run the installation file. Thus, the application needed by the user can be automatically synchronized to the destination terminal without the user to manually download and install the file, making the user operation more convenient.

The above describes certain embodiments of the present invention, but the scope of the present invention is not limited thereto, and those skilled in the art may easily think of variations, changes, modifications or replacements of the present invention within the disclosed technical scope. Any of those variations, changes, modifications or replacements should fall within the protection scope of the present invention. Accordingly, the scope of the present invention should be the scope of the claims.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

According to the disclosed embodiments of the present invention, an application synchronization application can be implemented based on a server. The server queries the installation file matching with the destination terminal based on the program identification of the target application and the terminal identification of the destination terminal included in the synchronization request message sent by the originating terminal, and sends the installation file to the destination terminal, so the destination terminal can run and install the installation file. Thus the application needed by the user can be automatically synchronized to the destination terminal without the need of the user to manually download and install the file, making the user operation more convenient.

What is claimed is:

1. An application synchronization method, comprising:
   establishing, by a server, a communication connection between an originating terminal and a destination terminal, wherein the originating terminal and the destination terminal respectively log in the server with a same login account;
   upon establishing the communication connection between the originating terminal and the server and between the destination terminal and the server, displaying a device list including the originating terminal and the destination terminal on the originating terminal and the destination terminal;
   receiving, by the server, a synchronization request message sent by the originating terminal, wherein the synchronization request message includes a program identification of a target application and a terminal identification of the destination terminal;
   obtaining, by the server, device information and address information of the destination terminal based on the terminal identification of the destination terminal;
   querying, by the server, an installation file matching with the program identification of the target application and the device information of the destination terminal; and
   sending, by the server, the installation file to the destination terminal based on the address information.

2. The method according to claim 1, before receiving the synchronization
   request message sent by the originating terminal, further comprising:
   checking, by the server, whether the originating terminal complies with a pre-established security policy and, when the originating terminal complies with the pre-established security policy, proceeding to receive the synchronization request message sent by the originating terminal.

3. The method according to claim 2, further comprising:
   obtaining, by the server, a user data of the target application installed on the originating terminal; and
   sending, by the server, the user data to the destination terminal.

4. The method according to claim 1, further comprising:
   obtaining, by the server, a user data of the target application installed on the originating terminal; and
   sending, by the server, the user data to the destination terminal.

5. The method according to claim 4, wherein sending the installation file to the destination terminal based on the address information further includes:
- compressing, by the server, the installation file; and
- sending, by the server, the compressed installation file to the destination terminal based on the address information.

6. The method according to claim 5, wherein the device information of the destination terminal includes:
- a device type and an operating system of the destination terminal.

7. The method according to claim 4, wherein sending by the server the installation file to the destination terminal based on the address information includes:
- when the transfer of the installation file is completed successfully, returning, by the server, a synchronization success indication message to the destination terminal.

8. The method according to claim 7, wherein the device information of the destination terminal includes:
- a device type and an operating system of the destination terminal.

9. The method according to claim 1, wherein when the originating terminal and the destination terminal are operated under different operation systems, a first program identification of the target application in the originating terminal included in the synchronization request message and a second program identification of the target application in the destination terminal corresponding to the installation file are the same.

10. An application synchronization server, includes:
- a memory; and
- a processor coupled to the memory, wherein the processor is configured to:
  - establish a communication connection between an originating terminal and a destination terminal, wherein the originating terminal and the destination terminal respectively log in the server through a same login account;
  - upon establishing the communication connection between the originating terminal and the server and between the destination terminal and the server, display a device list including the originating terminal and the destination terminal on the originating terminal and the destination terminal;
  - receive a synchronization request message sent by the originating terminal, and the synchronization request message includes a program identification of a target application and a terminal identification of the destination terminal;
  - obtain device information and address information of the destination terminal based on the terminal identification of the destination terminal;
  - query an installation file matching with the program identification of the target application and the device information of the destination terminal; and
  - send the installation file to the destination terminal based on the address information.

11. The server according to claim 10,
wherein the processor is further configured to:
check whether the originating terminal complies with a pre-established security policy and to instruct the obtaining module to proceed when the originating terminal complies with the pre-established terminal.

12. The server according to claim 11,
wherein the processor is further configured to:
obtain a user data of the target application installed on the originating terminal and to send the user data to the destination terminal.

13. The server according to claim 10,
wherein the processor is further configured to:
obtain a user data of the target application installed on the originating terminal and to send the user data to the destination terminal.

14. The server according to claim 13, wherein the processor is further configured to compress the installation file and to send the compressed installation file to the destination terminal based on the address information.

15. The server according to claim 14, wherein the device information of the destination terminal includes a device type and an operating system of the destination terminal.

16. The server according to claim 13, wherein the processor is further configured to return a synchronization success indication message to the originating server when the transfer of the installation file is completed successfully.

17. An application synchronization system comprising a server according to claim 13, further comprising:
- an originating terminal; and
- at least a destination terminal,
- wherein the server establishes a communication connection between the originating terminal and the destination terminal, and the originating terminal and the destination terminal log in the server in a same login account.

18. The server according to claim 10, wherein when the originating terminal and the destination terminal are operated under different operation systems, a first program identification of the target application in the originating terminal included in the synchronization request message and a second program identification of the target application in the destination terminal corresponding to the installation file are the same.

* * * * *